(12) United States Patent
Leibl

(10) Patent No.: US 9,505,437 B2
(45) Date of Patent: Nov. 29, 2016

(54) SUBFRAME ASSEMBLY FOR A VEHICLE

(71) Applicant: AUDI AG, Ingolstadt (DE)

(72) Inventor: Peter Leibl, Manching (DE)

(73) Assignee: AUDI AG, Ingolstadt (DE)

( * ) Notice: Subject to any disclaimer, the term of this patent is extended or adjusted under 35 U.S.C. 154(b) by 43 days.

(21) Appl. No.: 14/563,521

(22) Filed: Dec. 8, 2014

(65) Prior Publication Data

US 2015/0158529 A1 Jun. 11, 2015

(30) Foreign Application Priority Data

Dec. 9, 2013 (DE) .................. 10 2013 020 565

(51) Int. Cl.
| | |
|---|---|
| *B62D 21/07* | (2006.01) |
| *B62D 21/11* | (2006.01) |
| *B60K 17/00* | (2006.01) |
| *B62D 21/03* | (2006.01) |
| *B62D 27/02* | (2006.01) |

(Continued)

(52) U.S. Cl.
CPC ............ *B62D 21/07* (2013.01); *B60K 17/00* (2013.01); *B62D 21/03* (2013.01); *B62D 21/11* (2013.01); *B62D 27/02* (2013.01); *B62D 29/007* (2013.01); *B60K 17/344* (2013.01)

(58) Field of Classification Search
CPC ...... B62D 21/07; B62D 27/02; B62D 21/03; B62D 29/007; B62D 21/11; B60K 17/00; B60K 17/344
USPC .......................................... 180/377
See application file for complete search history.

(56) References Cited

U.S. PATENT DOCUMENTS

| | | | | |
|---|---|---|---|---|
| 4,501,436 A | * | 2/1985 | Ishida ............... | B60G 3/06 180/291 |
| 5,879,026 A | * | 3/1999 | Dostert ............. | B60G 3/24 180/311 |
| 6,511,096 B1 | * | 1/2003 | Kunert .............. | B60G 7/02 280/124.109 |

(Continued)

FOREIGN PATENT DOCUMENTS

| | | |
|---|---|---|
| DE | 19922800 | 11/1999 |
| DE | 102008057196 | 7/2009 |

(Continued)

OTHER PUBLICATIONS

European Search Report with respect to counterpart European patent application EP 14 00 4104.

(Continued)

*Primary Examiner* — Karen Beck
(74) *Attorney, Agent, or Firm* — Henry M. Feiereisen LLC.

(57) ABSTRACT

A subframe assembly for a vehicle includes a multipart subframe having two spaced-apart longitudinal members and two spaced-apart cross members connecting the longitudinal members. A transfer case is supported on the subframe between the longitudinal and cross members and has an input shaft in driving relation to two output shafts, and a bearing element which extends in axis-parallel relation to the input shaft and which is shifted in a direction of one of the longitudinal members and projects from the transfer case. A first one of the cross members is crossed by a portion of the transfer case at a crossing section and has two shell parts connected to one another at least at one area. Each shell part has a bracket, with the bracket of one shell part and the bracket of the other shell part jointly forming a bearing mount for the bearing element.

11 Claims, 3 Drawing Sheets

(51) Int. Cl.
 *B62D 29/00* (2006.01)
 *B60K 17/344* (2006.01)

(56) References Cited

U.S. PATENT DOCUMENTS

| | | | | |
|---|---|---|---|---|
| 7,357,461 | B2* | 4/2008 | Zuber | B60G 7/02 280/124.153 |
| 7,584,815 | B2* | 9/2009 | Ogawa | B60G 3/20 180/312 |
| 7,946,377 | B2* | 5/2011 | Frasch | B62D 21/11 180/312 |
| 9,027,945 | B2* | 5/2015 | Leibl | B62D 21/11 180/375 |
| 9,079,620 | B2* | 7/2015 | Komiya | B62D 21/11 |
| 9,085,329 | B2* | 7/2015 | Komiya | B62D 21/11 |
| 2006/0278463 | A1* | 12/2006 | Anzai | B62D 21/11 180/312 |
| 2007/0024044 | A1* | 2/2007 | Ogawa | B60G 3/20 280/788 |
| 2013/0300157 | A1* | 11/2013 | Leibl | B62D 21/11 296/204 |
| 2014/0110916 | A1 | 4/2014 | Leibl | |
| 2015/0158529 | A1* | 6/2015 | Leibl | B60K 17/00 180/377 |
| 2015/0166104 | A1* | 6/2015 | Ohhama | B62D 21/11 296/193.01 |

FOREIGN PATENT DOCUMENTS

| | | |
|---|---|---|
| EP | 1 035 003 A2 | 9/2000 |
| EP | 2 093 131 A2 | 8/2009 |
| EP | 2 578 473 A1 | 4/2013 |
| WO | WO 2013/110528 A1 | 8/2013 |

OTHER PUBLICATIONS

Translation of European Search Report with respect to counterpart European patent application EP 14 00 4104.

* cited by examiner

SUBFRAME ASSEMBLY FOR A VEHICLE

CROSS-REFERENCES TO RELATED APPLICATIONS

This application claims the priority of German Patent Application, Serial No. 10 2013 020 565.4, filed Dec. 9, 2013, pursuant to 35 U.S.C. 119(a)-(d), the disclosure of which is incorporated herein by reference in its entirety as if fully set forth herein.

BACKGROUND OF THE INVENTION

The present invention relates to a subframe assembly for a vehicle.

The following discussion of related art is provided to assist the reader in understanding the advantages of the invention, and is not to be construed as an admission that this related art is prior art to this invention.

Subframe assemblies are used in vehicles with driven rear axle. The subframe, also referred to as axle bracket, forms a framework of two longitudinal members in parallel spaced-apart relationship which are connected by two cross members that are also arranged in parallel spaced-apart relationship. The free space or clearance between the longitudinal and cross members is used for receiving a transfer case, also referred to as intermediate transmission or differential. An input shaft extends from the drive source into the transfer case and has a torque which is distributed to two output shafts that exit the transfer case to the side. The subframe has attachment points for wheel-guiding control arms which are connected to both the subframe and a wheel carrier that receives the wheel. The subframe assembly can be connected in its entirety to the vehicle body, with the subframe being mounted elastically to the vehicle body via several, suitably four, bearings.

The term "subframe assembly" is used in the description as relating to a componentry that includes a subframe and a transfer case. In practice, while wheel-guiding components such as control arm, wheel carrier or brake system may also be incorporated in this componentry, they are secondary within the scope of the present invention so that further description thereof is substantially omitted for the sake of simplicity.

It would be desirable and advantageous to provide an improved subframe assembly for a vehicle to obviate prior art shortcomings and to have a compact size while enabling a superior force introduction of a bearing element of a transfer case into a respective cross member.

SUMMARY OF THE INVENTION

According to one aspect of the present invention, a subframe assembly for a vehicle includes a multipart subframe having two longitudinal members in spaced-apart relationship, and two cross members disposed in spaced-apart relationship and connecting the longitudinal members, a transfer case supported on the subframe between the longitudinal and cross members, the transfer case having an input shaft in driving relation to two output shafts, and a bearing element which extends in axis-parallel relation to the input shaft and which is shifted in a direction of one of the longitudinal members and projects from the transfer case, wherein a first one of the cross members is crossed by a portion of the transfer case at a crossing section and has two shell parts connected to one another at least at one area, each shell part having a bracket, with the bracket of one of the shell parts and the bracket of the other one of the shell parts jointly forming a bearing mount for the bearing element.

As the one of the cross members, which is intersected by a portion of the transfer case, is made from two shell parts that are connected in at least one area and have each a bracket for receiving the bearing element of the transfer case, which bearing element extends in axis-parallel relation to the input shaft and is shifted in a direction of one of the longitudinal members, i.e. to about the side, to project from the transfer case, the force generated by a relative movement of the transfer case can be introduced into the one cross member in a particular effective manner via the bearing element. There are no joints, such as weld seams in particular, along the load path from the bearing mount to the longitudinal members. A joint advantageously extends in vertical vehicle direction on the topside of the cross member along and in transverse vehicle direction between the brackets there through. Both shell parts overlap at the joint seam in at least one area. As the bearing element projects to the side from the transfer case, the respective bearing mount on the cross member can be realized in this region without significant weakening of the structure. In particular, the cross section of the one cross member can be kept substantially constant in this region, thereby again positively affecting the force introduction. The longitudinal members have mounts for subframe bearings via which the subframe can be elastically connected with the vehicle body. Any force from the transfer case can be introduced into the vehicle body via these subframe bearings. The subframe, especially the longitudinal members, have further bearing points for securement of wheel guiding elements such as, e.g., transverse control arms and longitudinal control arms.

According to another advantageous feature of the present invention, the first one of the cross members can have a curved portion which crosses below the portion of the transfer case. Advantageously, the cross section of the cross member remains substantially the same in the area of the curved portion and does also not deviate in any significant way from the cross section of the remainder of the cross member. This maintains strength of the cross member at a high level. The curved portion in the crossing section of the first cross member, which curved portion the transfer case, especially its input shaft flange crosses underneath, positively affects the use of available space.

According to another advantageous feature of the present invention, the input shaft can extend substantially at level with the longitudinal members. In other words, the input shaft can extend substantially in a common plane with the longitudinal members. As a result, the subframe assembly is very compact especially in vertical vehicle direction.

According to another advantageous feature of the present invention, the two shell parts can form together a downwardly open profile, as viewed in a vertical vehicle direction. The provision of a downwardly open profile is especially useful to receive a torsion bar stabilizer or steering gear so that overall much installation space can be saved.

According to another advantageous feature of the present invention, the transfer case can have bearing elements, with a second one of the cross members having two bearing mounts for receiving the bearing elements. The bearing mounts are aligned horizontally, when the subframe is installed and spaced from one another for improved torque support.

According to another advantageous feature of the present invention, the two bearing mounts can be sized to extend widthways through the second one of the cross members.

Rubber-metal bush bearings can be placed in thus-formed through openings. Both bearing mounts of the second cross member and also the bearing mount of the first cross member form together a triangle in plan view.

According to another advantageous feature of the present invention, the first one of the cross members can be arranged at a leading end of the subframe, as viewed in a longitudinal vehicle direction. This, for example, may be the case for a vehicle with front engine and rear-wheel drive or all-wheel drive. When rear-wheel drives are involved, the subframe would have to be constructed mirror-inverted and the first cross member would have to be arranged on the trailing end of the subframe, as viewed in longitudinal vehicle direction.

According to another advantageous feature of the present invention, the shell parts may be formed as malleable sheet metal parts. In particular the brackets may be formed by suitably forming the shell parts.

According to another advantageous feature of the present invention, the subframe can be configured as a welding assembly. This is beneficial because the subframe can then be realized with optimal weight through selection and dimensioning of material according to need.

According to another aspect of the present invention, a vehicle comprises a subframe assembly which includes a multipart subframe having two longitudinal members in spaced-apart relationship, and two cross members disposed in spaced-apart relationship and connecting the longitudinal members, a transfer case supported on the subframe between the longitudinal and cross members, the transfer case having an input shaft and a bearing element which extends in axis-parallel relation to the input shaft and which is shifted in a direction of one of the longitudinal members and projects from the transfer case, wherein a first one of the cross members is crossed by a portion of the transfer case at a crossing section and has two shell parts connected to one another at least at one area, each shell part having a bracket, with the bracket of one of the shell parts and the bracket of the other one of the shell parts jointly forming a bearing mount for the bearing element.

A vehicle in accordance with the present invention can include the subframe assembly on the rear end as part of the rear axle. The subframe is connected elastically at several locations with the vehicle body structure and has wheel-guiding control arms which in turn are connected with each one of the wheel carriers. The drive source is arranged in the front structure of the vehicle and conducts its torque via the input shaft of the transfer case at least in part into the transfer case which transfers the torque, according to need, via the output shafts to the wheels, associated to the wheel carriers, so as to generate a rotation of the wheels.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
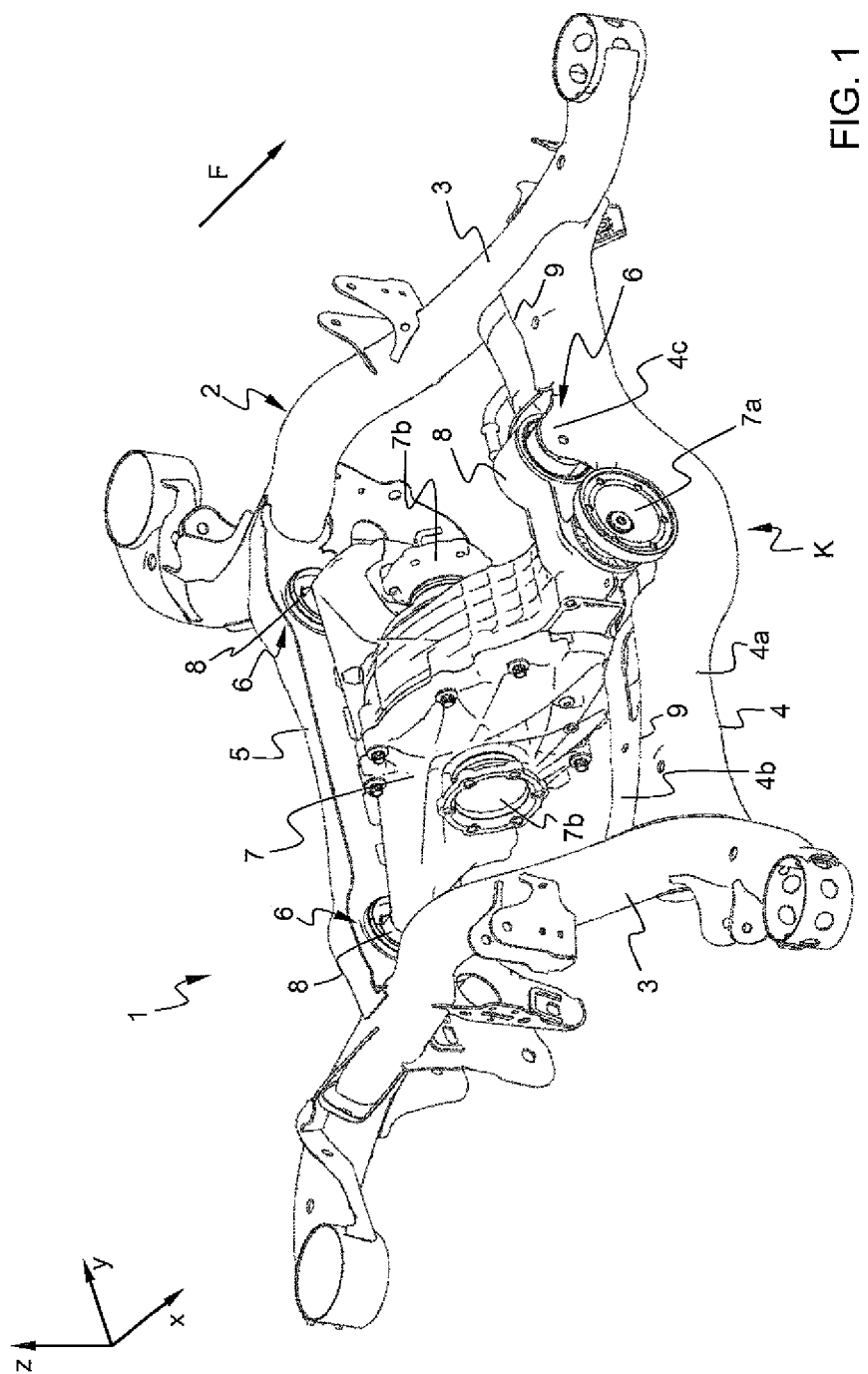
FIG. 1 is an isometric view of a subframe assembly according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an isometric view of a subframe assembly according to the present invention, generally designated by reference numeral 1. The subframe assembly 1 includes a subframe 2 which has two longitudinal members 3 arranged as mirror images in spaced-apart relationship and connected by two spaced-apart cross members 4, 5 to form the subframe 2. A first cross member 4 is arranged in travel direction F at a leading end of the subframe 2 and a second cross member 5 is arranged in travel direction F at a trailing end of the subframe 2. A clearance is formed between the cross members 4, 5 and the longitudinal members 3 for accommodating a transfer case 7 having an input shaft 7a pointing in travel direction F and two output shafts 7b extending in a transverse vehicle direction y in opposite directions. The input shaft 7a extends at about level with the adjacent longitudinal members 3, as viewed in vertical vehicle direction z, and traverses the first cross member 4 at a crossing section K. The first cross member 4 has a curved portion which crosses underneath the input shaft 7a.

The first cross member 4 is comprised of two shell parts 4a, 4b, with the shell parts 4a, 4b jointly forming a downwardly open U-shaped profile, as viewed in vertical vehicle direction z. Both shell parts 4a, 4b overlap in some areas on the topside of the cross member 4 that has been formed by the shell parts 4a, 4b and are connected, advantageously welded, to one another by a material joint along respective joint seams 9. Each of the two shell parts 4a, 4b is formed with a bracket 4c which extends upwards in vertical vehicle direction z and thus projects from the first cross member 4. The two brackets 4c together establish a bearing mount 6 which is oriented horizontally in longitudinal vehicle direction x for receiving a bearing element 8 of a transfer case 7. The bearing element 8 is hereby shifted in axis-parallel relation away from the input shaft 7a in a direction of one of the longitudinal members 3 so that the position of the bearing mount 6 on the first cross member 4 is almost inevitably established.

The second cross member 5 has two further bearing mounts 6 which traverse widthways the second cross member 5 and are oriented in longitudinal vehicle direction x. The bearing mounts 6 of the second cross member 5 are configured to receive respective bearing elements 8 of the transfer case 7. All bearing mounts 6 jointly form a triangle, as viewed by a plan view. Each of the bearing elements 8 includes a conventional rubber-metal bush bearing.

Figure 2:
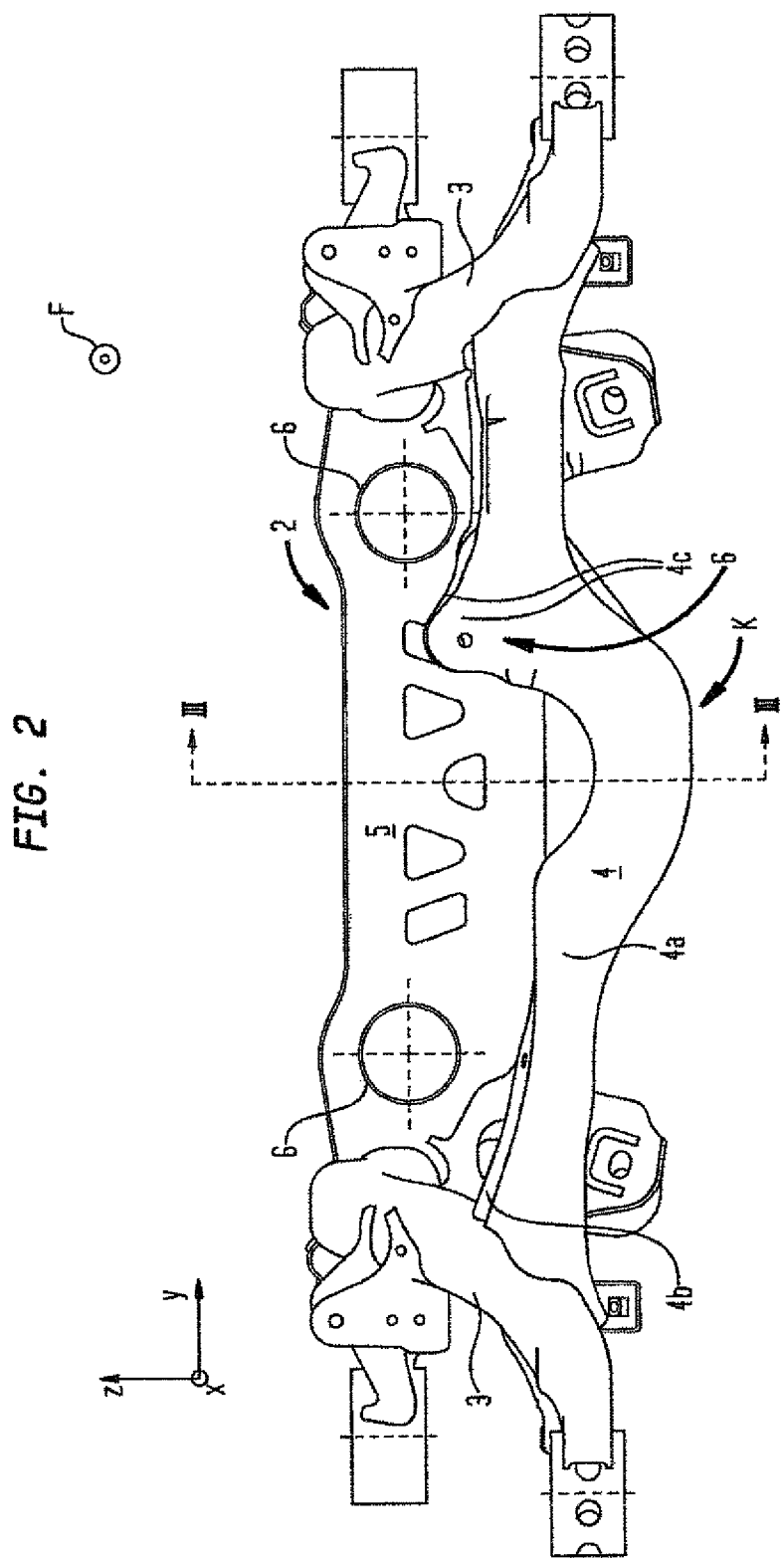
FIG. 2 is a front view of a subframe of the subframe assembly.

FIG. 2 shows the subframe 2, comprised of the two mirror-symmetrical, spaced-apart longitudinal members 3, the leading first cross member 4 and the trailing second cross member 5, as viewed in travel direction F. The first cross member 4 is composed of two shell parts 4a, 4b, with each of the shell parts 4a, 4b forming a bracket 4c to jointly form the bearing mount 6. FIG. 2 clearly shows the curved portion of the first cross member 4 in the crossing section K, with the bearing mount 6 being arranged at a marginal area adjacent to the crossing section K. The second cross member 5 has the two further bearing mounts 6, respectively formed by throughbores which extend in longitudinal vehicle direction x widthways through the second cross member 5.

Figure 3:
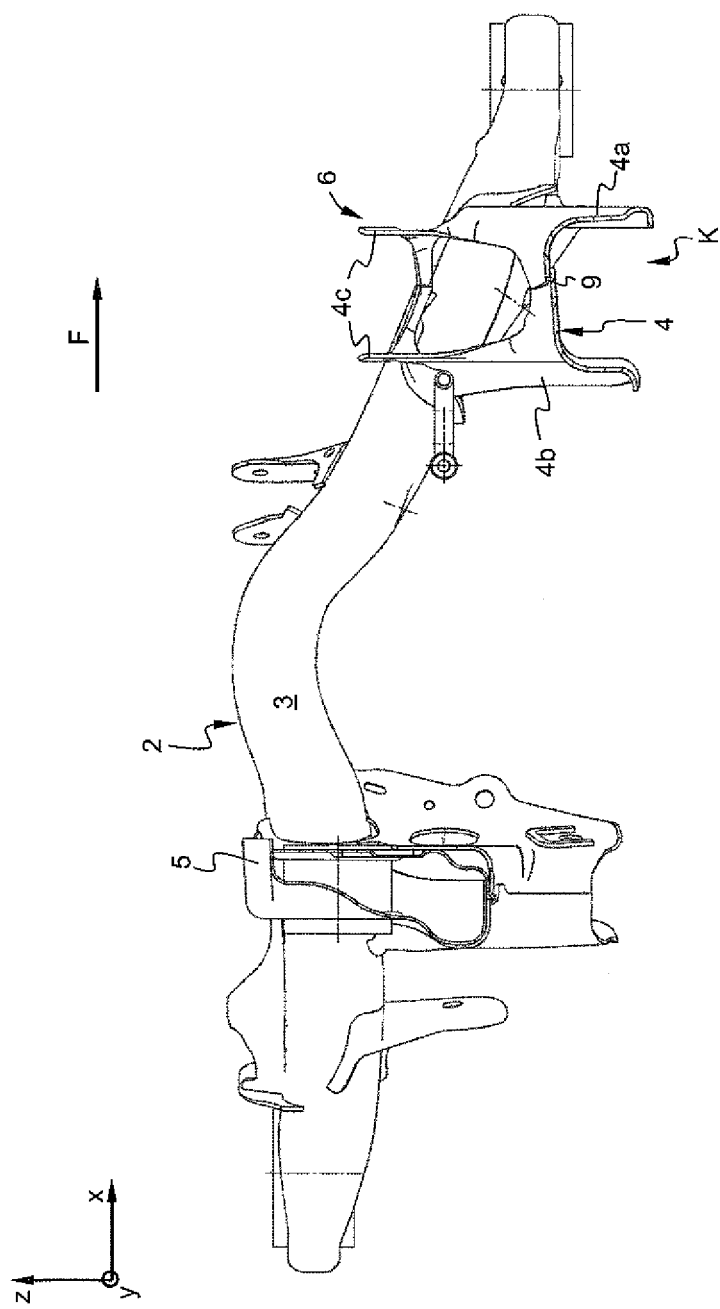
FIG. 3 is a sectional view of the subframe, taken along the line III-III in FIG. 2.

FIG. 3 is a sectional view of the subframe 2, taken along the line 111-111 in FIG. 2, and shows in particular the configuration of the first cross member 4. The two shell parts 4a, 4b slightly overlap on the topside of the first cross member 4 so that a linear joint seam 9 can be formed through welding. The joint seam 9 extends in line between the brackets 4c; as viewed in transverse vehicle direction y. The first cross member 4 has a downwardly open U-shaped profile which may be closed at short sections to selectively provide further stiffening.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A subframe assembly for a vehicle, comprising:
   a multipart substantially horizontal subframe having two longitudinal members in spaced-apart relationship, and two cross members disposed in spaced-apart relationship and connecting the longitudinal members;
   a transfer case supported on the subframe between the longitudinal and cross members, said transfer case having an input shaft in driving relation to two output shafts, and a bearing element which extends in axis-parallel relation to the input shaft and which is shifted in a direction of one of the longitudinal members and projects from the transfer case,
   wherein a first one of the cross members is crossed by a portion of the transfer case at a crossing section and has two shell parts connected to one another at least at one area, the shell parts both extending in a longitudinal direction of the one cross member and are spaced from one another in a transverse direction of the one cross member, each said shell part having a bracket extending vertically upwardly from the shell part, with the bracket of one of the shell parts and the bracket of the other one of the shell parts jointly forming a bearing mount for the bearing element.

2. The subframe assembly of claim 1, wherein the first one of the cross members has a curved portion which crosses underneath the portion of the transfer case.

3. The subframe assembly of claim 1, wherein the first one of the cross members has a cross section which substantially corresponds in an area of the curved portion to a remainder of the first one of the cross members.

4. The subframe assembly of claim 1, wherein the input shaft extends substantially at level with the longitudinal members.

5. The subframe assembly of claim 1, wherein the two shell parts form together a downwardly open profile, as viewed in a vertical vehicle direction.

6. The subframe assembly of claim 1, wherein the transfer case has two of said bearing element, wherein a second one of the cross members has two bearing mounts for receiving the bearing elements.

7. The subframe assembly of claim 6, wherein the two bearing mounts are sized to extend widthways through the second one of the cross members.

8. The subframe assembly of claim 1, wherein the first one of the cross members is arranged at a leading end of the subframe, as viewed in a longitudinal vehicle direction.

9. The subframe assembly of claim 1, wherein the shell parts are formed as malleable sheet metal parts.

10. The subframe assembly of claim 1, wherein the subframe is configured as a welding assembly.

11. A vehicle, comprising a subframe assembly which includes a multipart substantially horizontal subframe having two longitudinal members in spaced-apart relationship, and two cross members disposed in spaced-apart relationship and connecting the longitudinal members, a transfer case supported on the subframe between the longitudinal and cross members, said transfer case having an input shaft and a bearing element which extends in axis-parallel relation to the input shaft and which is shifted in a direction of one of the longitudinal members and projects from the transfer case, wherein a first one of the cross members is crossed by a portion of the transfer case at a crossing section and has two shell parts connected to one another at least at one area, the shell parts both extending in a longitudinal direction of the one cross member and are spaced from one another in a transverse direction of the one cross member, each said shell part having a bracket extending vertically upwardly from the shell part, with the bracket of one of the shell parts and the bracket of the other one of the shell parts jointly forming a bearing mount for the bearing element,
   wherein a first one of the cross members is crossed by a portion of the transfer case at a crossing section and has two shell parts connected to one another at least at one area, the shell parts both extending in a longitudinal direction of the one cross member and are spaced from one another in a transverse direction of the one cross member, each said shell part having a bracket extending vertically upwardly from the shell part, with the bracket of one of the shell parts and the bracket of the other one of the shell parts jointly forming a bearing mount for the bearing element.

* * * * *